July 2, 1929.   I. MORIOKA   1,719,483

PHOTOGRAPHIC METHOD OF REPRODUCING ORIGINAL OBJECTS

Filed Sept. 21, 1927

INVENTOR
ISAO MORIOKA
BY
ATTORNEYS

Patented July 2, 1929.

1,719,483

UNITED STATES PATENT OFFICE.

ISAO MORIOKA, OF TOKYO, JAPAN.

PHOTOGRAPHIC METHOD OF REPRODUCING ORIGINAL OBJECTS.

Application filed September 21, 1927. Serial No. 220,999.

This invention relates to a method for use in producing a model of an object, for instance a person or bust, by the aid of photography.

More particularly the purpose of the invention is to obtain photographically a plurality of templets conforming to all the profiles of the object which are to be reproduced, whereby by the aid of such templets a replica of the object can be made.

Now to photograph the profile of an object without photographing the remainder of such object, which would unnecessarily occupy space on the photographic film, it is necessary that the profile alone be illuminated. Such illumination of the profile without illuminating any substantial portion of the remainder of the surface of the object can be effected by a beam of light approximately confined to a single vertical plane.

To view a profile or silhouette of the object undistorted by foreshortening, the object must be viewed from a direction at right angles to the plane of such profile. However, a profile illuminated by light confined to a single vertical plane is not visible at right angles to the plane of the profile so illuminated and consequently such profile cannot be photographed from such right-angled position. This difficulty is overcome according to the present invention by photographing the illuminated line on the object, from a position in which the photographic axis is at less than a right angle to the direction of the illuminating beam of light. This however produces a foreshortened image of the illuminated profile line which by a subsequent photographic projection is converted into a true reproduction of the profile.

The method, according to the invention, therefore consists in photographing the object, illuminated by a narrow vertical beam of light impinging on the object at a constant acute angle to the photographic axis, from a series of successive positions, converting by photographic projection into undistorted profiles the resultant photographically recorded foreshortened profiles of the object, and forming modelling templets in accordance with such undistorted profiles.

The profiles, both when foreshortened and true, are photographed on a photographic film as a series of closely adjacent successive profiles.

In order that the invention may be more fully understood reference is made to the accompanying drawing, in which.

Figure 6:
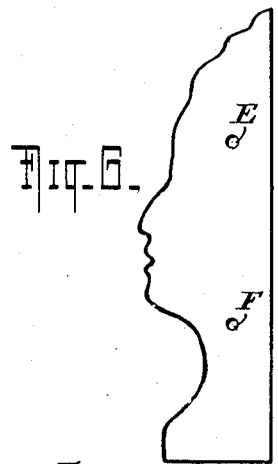
Figures 4, 5:
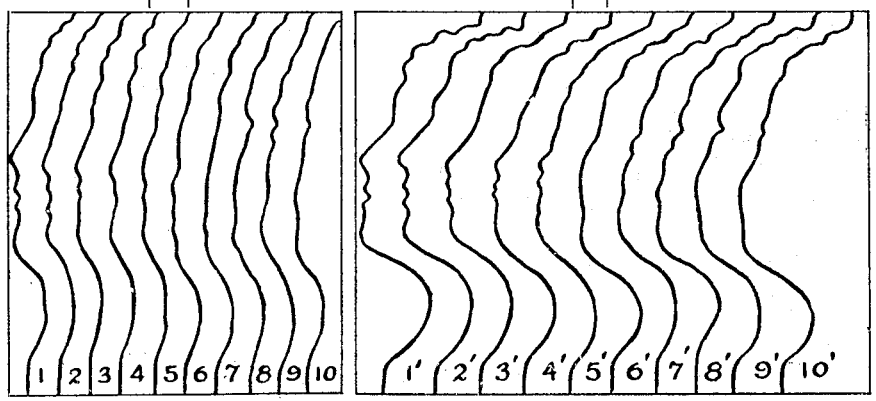
Figure 4 shows a series of foreshortened profiles recorded on a photographic film.

Figure 5 the corresponding profiles rendered true by photographic projection; and Figure 6 is a plan view of one of the modelling templets made in accordance with a true profile.

Figure 1:
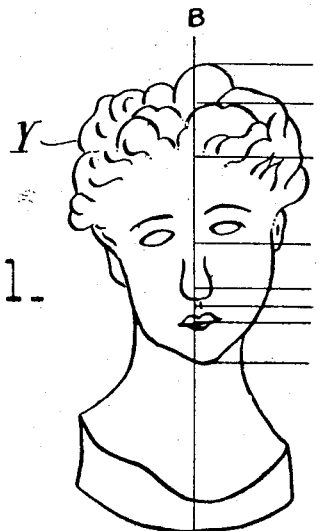
Figure 1 is a front elevation of a bust to be photographed and reproduced.
Figure 2:
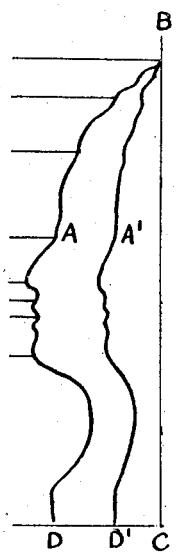
Figure 2 shows one of the profiles thereof and the same profile as photographed foreshortened.
Figure 3:
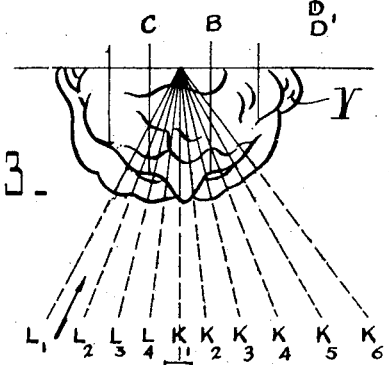
Figure 3 is a plan of the bust.

B A D C, Figure 2, is a representative profile of the object shown in Figure 1, which when photographed at an acute angle to the direction of illumination gives on the photographic film the foreshortened profile shown by the line B $A^1$ $D^1$ C. Figure 3 shows the relative positions of the object Y, the camera $K^1$ etc. and the direction of light $L^1$ etc. thrown on the object, and also the manner in which the series of foreshortened profiles 1, 2, 3, 4, 5 . . . 10, Figure 4, can be produced by changing the relative position of the camera $K^1$, $K^2$, $K^3$, $K^4$, $K^5$ etc. and the light source $L^1$, $L^2$, $L^3$, $L^4$, $L^5$ etc. with respect to the object.

The light is projected upon the object through a very narrow vertical slit, so that the vertical central axis B C of the object is contained in the vertical plane of light, which cuts the object at the profile, for instance B A D C. Other profiles 1, 2, 3, 4, 5 etc. can be obtained similarly by either rotating the photographing apparatus around the object or rotating the object at a fixed position with the central axis as the axis of the rotation. In this case, the angle which is comprised by the line connecting the camera and the object and that connecting the light source and the object, is limited to an acute angle of about 5°. The series of foreshortened profiles 1, 2, 3, 4, 5 etc. thus obtained is by the photographic method similar to that of geometrical projection, next converted to form another series of profiles $1^1$, $2^1$, $3^1$, $4^1$, $5^1$ . . . $10^1$, Figure 5, as they appear if they could be taken at right angles to the projecting light. Then the profiles are cut out and the separate fragments thus obtained are employed to make templets of any suitable material which are assembled in order to constitute a matrix enclosing a complete spacial image entirely similar to the original object.

The assembling of the templets may be carried out in any suitable manner. But a method conveniently employed is that in each templet two small holes E and F are pierced at a certain same distance from the reference line and from the horizontal axis of the film (not shown in the drawing), and all the templets are held together in their correct sequence by passing a circular ring of wire through these holes, cutting off a portion thereof adjoining the central axis as required.

As regards the advantages of the said invention, among others, is pointed out the possibility of the reproduction of the likeness of the original object with such accuracy that minute characteristics are not missed, to say nothing of the ease of obtaining the same in any desired dimensions, for the enlargement or the contraction is easily performed by the photographic method in the course of the conversion of the acute-angle-photographed profiles into the right-angle-photographed profiles.

I claim:

1. A method of producing a model of an object by the aid of photography, consisting in illuminating the object by a beam of light practically confined in a single vertical plane, photographing on a film the illuminated line on the object from such a direction that the photographic axis makes with the said vertical plane an acute angle less than a right angle, causing the illuminated line to move circumferentially relative to the object and photographing the object always at the same acute angle while feeding the film horizontally by a certain small pitch distance, whereby a series of foreshortened profiles are taken on the film in very close proximity one after another in parallel relation, converting by photographic projection the foreshortened profiles thus taken into a series of undistorted profiles, forming templets in accordance with such undistorted profiles, and assembling the templets thus formed.

2. A method of producing a model of an object by the aid of photography, consisting in illuminating the object by a beam of light practically confined in a single vertical plane, photographing on a film the illuminated line on the object from such a direction that the photographic axis makes with the said vertical plane an acute angle less than a right angle, causing the illuminated line to move circumferentially relative to the object and photographing the object always at the same acute angle while feeding the film horizontally by a certain small pitch distance, whereby a series of foreshortened profiles are taken on the film in very close proximity one after another in parallel relation, converting by photographic projection the foreshortened profiles thus taken into a similar series of undistorted profiles very closely situated one after another in parallel relation, forming templets in accordance with such undistorted profiles, and assembling the templets thus formed.

3. A method of producing a model of an object by the aid of photography, consisting in illuminating the object by a beam of light practically confined in a single vertical plane, photographing on a film the illuminated line on the object from such a direction that the photographic axis makes with the said vertical plane an acute angle less than a right angle, causing the illuminated line to move circumferentially relative to the object and photographing the object always at the same acute angle while feeding the film horizontally by a certain small pitch distance, whereby a series of foreshortened profiles are taken on the film in very close proximity one after another in parallel relation, converting the foreshortened profiles thus taken into a similar series of undistorted profiles by causing the film, properly illuminated, to travel in front of a narrow slit and projecting the profiles on to another photographic film disposed at an inclination with respect to the first mentioned film, and causing the second mentioned film to travel in the opposite direction, then forming templets in accordance with such undistorted profiles and assembling the templets thus formed.

In testimony whereof I affix my signature.

ISAO MORIOKA.